United States Patent
Mihara et al.

(10) Patent No.: US 10,654,227 B2
(45) Date of Patent: May 19, 2020

(54) METHOD OF MANUFACTURING RESIN MOLDED ARTICLE AND RESIN MOLDED ARTICLE

(71) Applicant: SUMITOMO RIKO COMPANY LIMITED, Komaki-shi, Aichi (JP)

(72) Inventors: Yasuhiko Mihara, Komaki (JP); Shigemitsu Hattori, Komaki (JP); Asami Nakai, Gifu (JP); Tadashi Uozumi, Gifu (JP); Akio Ohtani, Gifu (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 612 days.

(21) Appl. No.: 15/051,215

(22) Filed: Feb. 23, 2016

(65) Prior Publication Data

US 2016/0271888 A1 Sep. 22, 2016

(30) Foreign Application Priority Data

Mar. 19, 2015 (JP) .................. 2015-055618

(51) Int. Cl.
*B29C 33/50* (2006.01)
*B29C 70/22* (2006.01)
(Continued)

(52) U.S. Cl.
CPC ............ *B29C 70/22* (2013.01); *B29C 33/505* (2013.01); *B29C 70/30* (2013.01); *B29C 70/446* (2013.01);
(Continued)

(58) Field of Classification Search
CPC ....... B29C 33/50; B29C 33/505; B29C 70/30; B29C 70/443; B29C 70/446
See application file for complete search history.

(56) References Cited

U.S. PATENT DOCUMENTS 5,080,020 A * 1/1992 Negishi .................. B61B 13/10
104/138.2
5,391,334 A * 2/1995 Enomoto .............. F16L 11/086
264/40.7
(Continued)

FOREIGN PATENT DOCUMENTS

DE 921232 C 12/1954
DE 10 2006 031 323 A1 1/2008
(Continued)

OTHER PUBLICATIONS

Oct. 22, 2018 Office Action issued in Japanese Patent Application No. 2015-055618.
(Continued)

*Primary Examiner* — Atul P. Khare
(74) *Attorney, Agent, or Firm* — Oliff PLC

(57) ABSTRACT

A method of manufacturing an elongated resin molded article having a hollow structure including: using an elongated elastic core including a composite of an elastic body and a continuous yarn; molding a resin material on an outer peripheral surface of the elastic core; and then exerting tensile force on the elastic core and extracting the elastic core in a lengthwise direction so as to obtain the elongated resin molded article having the hollow structure. An elongated resin molded article having a hollow structure, including a curved portion and a branched portion in combination, wherein the resin molded article has a composite structure in which a resin material is reinforced with a braided continuous fiber across an entire length thereof including the curved portion and the branched portion.

17 Claims, 8 Drawing Sheets

(51) Int. Cl.
  *B29C 70/54* (2006.01)
  *B29C 70/44* (2006.01)
  *B29C 70/30* (2006.01)
  *B29C 70/34* (2006.01)
  *B29K 277/00* (2006.01)
  *B29L 23/00* (2006.01)
  *B29K 267/00* (2006.01)

(52) U.S. Cl.
  CPC ........ *B29C 70/543* (2013.01); *B29K 2267/00* (2013.01); *B29K 2277/00* (2013.01); *B29L 2023/00* (2013.01)

(56) References Cited

U.S. PATENT DOCUMENTS

| | | | | |
|---|---|---|---|---|
| 7,017,616 | B2* | 3/2006 | Ono | F16L 11/086 138/124 |
| 9,492,974 | B2* | 11/2016 | Zahlen | B29C 33/505 |
| 10,207,463 | B2* | 2/2019 | Jacob | B29C 33/3821 |
| 2008/0020193 | A1* | 1/2008 | Jang | B29C 70/025 428/292.1 |
| 2010/0092708 | A1 | 4/2010 | Jacob et al. | |
| 2011/0281061 | A1 | 11/2011 | Nakamura et al. | |

FOREIGN PATENT DOCUMENTS

| | | | | |
|---|---|---|---|---|
| DE | 10 2010 056 293 A1 | | 6/2012 | |
| DE | 102011113200 A1 | * | 3/2013 | ............ B29C 33/52 |
| DE | 10 2012 004 942 A1 | | 9/2013 | |
| EP | 2468484 A1 | * | 6/2012 | .......... B29C 33/505 |
| JP | 01184124 A | * | 7/1989 | |
| JP | H01215533 A | | 8/1989 | |
| JP | 02141229 A | * | 5/1990 | |
| JP | H08-174701 A | | 7/1996 | |
| JP | 10166397 A | * | 6/1998 | |
| JP | H11-020031 A | | 1/1999 | |
| JP | H11-244424 A | | 9/1999 | |
| JP | 3705384 B2 | | 10/2005 | |
| JP | 4047089 B2 | | 2/2008 | |
| JP | 2008094145 A | | 4/2008 | |
| JP | 2008-155383 A | | 7/2008 | |
| JP | 2009-179000 A | | 8/2009 | |
| JP | 2009179001 A | * | 8/2009 | |
| JP | 2009-269348 A | | 11/2009 | |
| WO | 2010-084809 A1 | | 7/2010 | |

OTHER PUBLICATIONS

Nov. 28, 2017 Office Action issued in German Patent Application No. 10 2016 002 856.4.
Feb. 3, 2020 Office Action issued in German Patent Application No. 10 2016 002 856.4.

* cited by examiner

METHOD OF MANUFACTURING RESIN MOLDED ARTICLE AND RESIN MOLDED ARTICLE

INCORPORATED BY REFERENCE

The disclosure of Japanese Patent Application No. 2015-055618 filed on Mar. 19, 2015 including the specification, drawings and abstract is incorporated herein by reference in its entirety.

BACKGROUND OF THE INVENTION

1. Field of the Invention

The present invention relates to a novel method of manufacturing a resin molded article having a hollow structure and a resin molded article having a novel structure which can be manufactured by the method.

2. Description of the Related Art

Resin molded articles have been used in various kinds of fields, for their advantage in weight-reducing, improvement of the mass-productivity, and the like. In recent years, the use of resin has been introduced even in structural elements etc. which require strength, with fiber-reinforced resins.

In order to secure the bending strength and the rigidity of various kinds of elongated members while reducing weight and materials, adopting a hollow cross sectional structure is advantageous. This makes it possible to keep a cross sectional area small while securing the second moment of area and the section modulus.

However, for resin molded articles manufactured by molding wherein a resin material is filled in a molding cavity and molded, using an elongated shape having a hollow cross section, generally leads to difficulty in removal of a core after molding, which makes it difficult to mass-produce the resin molded articles. Although it is conceivable for example that a molded core of a low melting point metal is used to remove it by melting after resin molding, the core must be molded for every resin molding in the case. Accordingly, the manufacturing process becomes complex and the manufacturing cost becomes expensive, making the mass-production difficult.

Therefore, conventionally used items are limited to only a solid resin member constituted by a plurality of components described in Japanese Patent No. JP-B-3705384 and a resin member in an extremely simple shape such as a straight tube described in Japanese Unexamined Patent Publication No. JP-A-1-215533. Thus, it was still difficult to accomplish enough the manufacture of various members using resin.

SUMMARY OF THE INVENTION

It is therefore one object of the present invention to provide a novel method of manufacturing a resin molded article having a hollow structure which is able to realize excellent mass-productivity.

It is another object of the present invention to provide a resin molded article with a hollow structure which can be produced by this novel manufacturing method and has a novel structure wherein the resin molded article has a complex shape including a curved portion and a branched portion in combination and the resin molded article is reinforced with braided continuous fiber.

The above and/or optional objects of this invention may be attained according to at least one of the following modes of the invention. The following modes and/or elements employed in each mode of the invention may be adopted at any possible optional combinations.

A first mode of the present invention provides a method of manufacturing an elongated resin molded article having a hollow structure comprising: using an elongated elastic core comprising a composite of an elastic body and a continuous yarn; molding a resin material on an outer peripheral surface of the elastic core; and then exerting tensile force on the elastic core and extracting the elastic core in a lengthwise direction so as to obtain the elongated resin molded article having the hollow structure.

According to the manufacturing method of the present mode, the elastic core including the composite of the elastic body and the continuous yarn is used as the core for resin molding. Therefore, when the tensile force is exerted on the elastic core from one end after resin molding, the tensile force is efficiently transmitted via the continuous yarn in the length direction of the elastic core. As a result, the tensile force is efficiently exerted on the elastic core up to the deep position in the length direction, whereby, inside the elongated resin molded article having the hollow structure, the cross sectional area is deformed to become smaller. This accelerates the removal of the elastic core from the inner face of the resin molded article, enabling easy extraction of the elastic core from the elongated resin molded article in the length direction.

Additionally, the extracted elastic core returns elastically and rapidly to the original shape by releasing the tensile force, making it possible to reuse it repeatedly in the next molding of the resin molded article.

Therefore, according to the method of the present invention, it is possible to manufacture the elongated resin molded article with a hollow cross section, which was difficult to realize in the past, with excellent mass-productivity.

A second mode of the present invention provides the method of manufacturing the resin molded article according to the first mode, wherein the elastic core has a cross sectional shape of a hollow.

According to the manufacturing method of the present mode, by the elastic core having the hollow cross section, when the tensile force is exerted on the elastic core after resin molding, the deformation into a smaller shape such that the cross section of the elastic core has a smaller outer peripheral length is caused more easily. Therefore, it is possible to extract and remove the elastic core from the resin molded article with a smaller tensile force.

A third mode of the present invention provides the method of manufacturing the resin molded article according to the second mode, further comprising filling the hollow with a non-compressible filler material, which is non-compressible and amorphous, during molding the resin material on the outer peripheral surface of the elastic core.

According to the manufacturing method of the present mode, even if the filling pressure of the resin material or the like is exerted on the outer peripheral surface of the elastic core when molding the resin material, unpredicted deformation of the elastic core is restrained. As a result, the shape and the dimension of the inner peripheral face of the resin molded article which will be obtained by the molding are stabilized with higher precision. As the non-compressible filler material, an amorphous filler material such as a liquid or a solid of powder form is used to make it easy to let it out fluently from inside the hollow of the elastic core after resin molding. Accordingly, it is possible to extract the elastic core from the resin molded article by exerting the tensile force on it after the non-compressible filler material is removed from the elastic core so as to easily allow deformation reducing the cross section of the elastic core.

A fourth mode of the present invention provides the method of manufacturing the resin molded article according to any of the first to third modes, wherein the continuous yarn of the elastic core extends in the lengthwise direction with either one of a braid structure and a spiral structure.

According to the manufacturing method of the present mode, the continuous yarn which is arranged to be slanted to the length direction of the elastic core is subject to deformation such that the tilting angle is made smaller owing to the action of the tensile force. This makes it possible to efficiently transmit the compression force to make the cross sectional area small, together with the tensile force in the length direction relative to the elastic core. As a result, it is possible to reduce the diameter of the elastic core across the entire length more efficiently to extract it in the removal of the mold after resin molding.

A fifth mode of the present invention provides the method of manufacturing the resin molded article according to any of the first to fourth modes, wherein the resin molded article is formed of a fiber-reinforced resin in which the resin material is fiber-reinforced.

According to the manufacturing method of the present mode, as described later, a resin molded article formed of a synthetic resin material reinforced as appropriate using reinforcing fiber such as carbon fiber, aramid fiber and glass fiber, can be manufactured with the hollow structure. The required strength or rigidity is secured by fiber-reinforcing, allowing the manufacture of a resin molded article with a wider application range.

A sixth mode of the present invention provides the method of manufacturing the fiber-reinforced resin molded article according to the fifth mode, wherein a reinforcing fiber comprising at least one continuous fiber is arranged on the outer peripheral surface of the elastic core, and the resin molded article comprising the fiber-reinforced resin which is reinforced with the reinforcing fiber is obtained by molding the resin material.

According to the manufacturing method of the present mode, the resin molded article which is molded on the outer peripheral surface of the elastic core is fiber-reinforced with the continuous fiber, whereby it is possible to realize a resin molded article having a greater strength relative to an article reinforced with discontinuous fiber such as short fiber or long fiber.

A seventh mode of the present invention provides the method of manufacturing the fiber-reinforced resin molded article according to the sixth mode, wherein the at least one continuous fiber comprises a plurality of continuous fibers, and the continuous fibers are arranged so as to cover the outer peripheral surface of the elastic core in a braided form while the elastic core is subjected to curving deformation.

According to the present mode, the elastic core is curved as appropriate taking advantage of its elasticity, making it possible to lead the plurality of continuous fibers provided from the outer periphery to arrange them on the surface of the elastic core which includes an irregular-shaped part such as a curved part, a bent part, or a branched part, for example. As a result, in the manufacture of a resin molded article in a complex shape having an irregular-shaped part such as a curved part, with an efficient reinforcing aspect including a braid-shaped braid or a spiral braid for example, the con-tinuous fibers can be actually arranged on the outer peripheral surface of the elastic core and hence in the resin molded article as the result.

Here, when obtaining the resin molded article fiber-reinforced with the reinforcing fiber formed of the continuous fiber, the preferably adopted molding processes are different, depending on whether the used resin material is thermosetting resin or thermoplastic resin. Especially where thermosetting resin is adopted, the manufacturing methods of the following eighth and ninth modes are preferable. On the other hand, where thermoplastic resin is adopted, the manufacturing methods of the following tenth to twelfth modes are preferable.

Specifically, an eighth mode of the present invention provides the method of manufacturing the resin molded article which is fiber-reinforced with the continuous fiber according to the sixth or seventh mode, wherein the resin material comprises thermosetting resin, and the resin molded article comprising the fiber-reinforced resin is obtained by arranging the continuous fiber impregnated with the thermosetting resin so as to cover the outer peripheral surface of the elastic core and then performing hardening process on the thermosetting resin.

Alternatively, a ninth mode of the present invention provides the method of manufacturing the resin molded article which is fiber-reinforced with the continuous fiber according to the sixth or seventh mode, wherein the resin material comprises thermosetting resin, and the resin molded article comprising the fiber-reinforced resin is obtained by arranging the continuous fiber so as to cover the outer peripheral surface of the elastic core and then, during molding the thermosetting resin, impregnating the continuous fiber with the thermosetting resin and performing hardening process thereon.

On the other hand, a tenth mode of the present invention provides the method of manufacturing the resin molded article which is fiber-reinforced with the continuous fiber according to the sixth or seventh mode, wherein the resin material comprises thermoplastic resin, and the resin molded article comprising the fiber-reinforced resin is obtained by arranging the thermoplastic resin of fiber form together with the continuous fiber so as to cover the outer peripheral surface of the elastic core and then performing melt molding process on the thermoplastic resin.

Additionally, an eleventh mode of the present invention provides the method of manufacturing the resin molded article which is fiber-reinforced with the continuous fiber according to the sixth or seventh mode, wherein the resin material comprises thermoplastic resin, and the resin molded article comprising the fiber-reinforced resin is obtained by adhering the thermoplastic resin of powder form to the continuous fiber and arranging the continuous fiber so as to cover the outer peripheral surface of the elastic core, and then performing melt molding process on the thermoplastic resin.

Furthermore, a twelfth mode of the present invention provides the method of manufacturing the resin molded article which is fiber-reinforced with the continuous fiber according to the sixth or seventh mode, wherein the resin material comprises thermoplastic resin, and the resin molded article comprising the fiber-reinforced resin is obtained by arranging the continuous fiber so as to cover the outer peripheral surface of the elastic core while providing an unpolymerized material of the thermoplastic resin on the outer peripheral surface of the elastic core and impregnating the material into the continuous fiber, and then performing polymerization molding process thereon.

In this way, depending on the used resin material for molding, the manufacturing method according to any of the above-described eighth to twelfth modes is adopted. As a result, it becomes possible to manufacture the resin molded article formed of the fiber-reinforced resin which is reinforced with the continuous fiber arranged in advance on the outer peripheral surface of the elastic core as described in the sixth or seventh mode with greater mass-productivity.

By the way, whether or not the resin is reinforced with the continuous fiber noted in the above-described sixth to twelfth modes, it is also possible to mold the resin molded article using a resin material mixed with short fiber or long fiber which is not braided or the like.

Specifically, a thirteenth mode of the present invention provides the method of manufacturing the resin molded article according to any of the fifth to twelfth modes, wherein the resin material mixed with a discontinuous reinforcing fiber is molded on the outer peripheral surface of the elastic core.

Moreover, a fourteenth mode of the present invention provides the method of manufacturing the resin molded article according to any of the first to thirteenth modes, wherein with the elastic core subjected to deformation, the resin material is molded on the outer peripheral surface of the elastic core.

According to the manufacturing method of the present mode, with the elastic core given a more intricate shape by elastically deforming it in relation to the original shape thereof, the resin is molded on the outer peripheral surface of the elastic core. This allows manufacture of a resin molded article in a more complex shape using the elastic core in a comparatively simple shape or the like.

In addition, with the present mode, in manufacturing the resin molded article reinforced with the continuous fiber described in any of the sixth to twelfth modes for example, it is also possible to arrange the continuous fiber on the outer peripheral surface of the elastic core and then elastically deform the elastic core depending on the shape of the target molded article, to mold the resin on the outer peripheral surface. This can make the work to arrange the continuous fiber in a braided form etc. on the outer peripheral surface of the elastic core even easier, by performing the work on the elastic core simplified in shape relative to the molded article.

Moreover, the deformation of the elastic core in this mode can be a mode wherein the shape in the length direction is changed in at least one portion in the length direction. For example, the mode wherein the elastic core in a straight line form is hold in a curved form to mold the resin on the outer peripheral surface thereof or the like, is included. Alternatively, it is possible to adopt the following fifteenth mode as the deformation of the elastic core of the present mode.

Specifically, a fifteenth mode of the present invention provides the method of manufacturing the resin molded article according to the fourteenth mode, wherein the deformation of the elastic core is such that a cross sectional shape of at least a part of the elastic core in the lengthwise direction is changed.

According to the above-referenced fourteenth or fifteenth mode, it is possible to mold a plurality of kinds of resin molded articles which varies in the curved form, the cross sectional shape or the like, while using the common elastic core, thereby enabling to realize the common use of the elastic core. The common use of the elastic core like this is effective, not only for reducing the cost in the manufacture of a resemble resin product, but also for manufacturing several kinds of resin prototypes to measure the characteristics of each item such as the strength for comparison, for example.

A sixteenth mode of the present invention provides the method of manufacturing the resin molded article according to any of the first to fifteenth modes, wherein the elastic core includes a branched part, the elastic core comprises a plurality of elongated divided elastic cores separably connected to each other at the branched part, and the divided elastic cores are separated and extracted in respective lengthwise directions after molding of the resin molded article.

According to the manufacturing method of the present mode, the resin molded article including at least one branch structure can be manufactured according to the method of this invention using the elastic core. This makes it possible to apply the method of this invention to the manufacture of a resin molded article in a more complex shape.

A seventeenth mode of the present invention provides an elongated resin molded article having a hollow structure, comprising a curved portion and a branched portion in combination, wherein the resin molded article has a composite structure in which a resin material is reinforced with a braided continuous fiber across an entire length thereof including the curved portion and the branched portion.

The resin molded article in the structure according to the present mode, which has a hollow, includes a reinforced structure by the continuous fiber, which could not be used in fact conventionally with an item having a curved portion and a branched portion in combination. In the present mode, the hollow resin molded article in a complicated and irregular shape having both the curved portion and the branched portion can be realized with the composite structure by reinforcing with the continuous fiber. Therefore, resin components can be actually used even for various parts which were conventionally thought difficult to manufacture with resin, including a suspension arm for an automobile, for example. An article of the present invention comprising this hollow resin molded article in a complex and irregular shape having a reinforced structure by the continuous fiber, which was not present in the past, can be manufactured by the above-mentioned manufacturing method according to this invention.

According to the present invention, the elastic core comprising a composite of the elastic body and the continuous yarn is used and the tensile force is exerted after molding the resin material. As a result, it is possible to efficiently transmit in the length direction the deformation of the elastic core by which the cross sectional area thereof is made small, and extract the elastic core so as to obtain the elongated resin molded article in a hollow structure.

Additionally, for the hollow-structured resin molded article according to this invention, it is possible to provide a resin molded article in a novel structure which was not present in the past, having a complex shape with both the curved portion and the branched portion and being reinforced with a braided continuous fiber.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
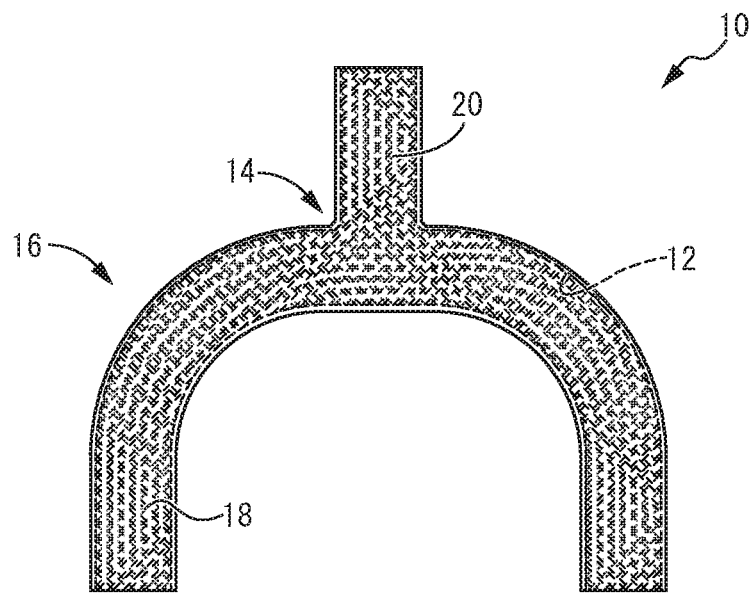
FIG. 1 is a front view showing a resin molded article as a first embodiment of the present invention.

Following, we will describe an embodiment of the present invention while referring to the drawings.

FIG. 1 shows a resin molded article 10 as a first embodiment of the present invention. The resin molded article 10 has a hollow structure with a consecutive hollow hole 12 inside, and an irregular shape which is not a simple straight tube shape, with a branched portion 14 and a curved portion 16. In this resin molded article 10, a mounting member is attached to each end part on or after resin molding, whereby the resin molded article 10 is used as a suspension member for an automobile or the like.

In more detail, the resin molded article 10 of the present embodiment has a structure wherein a long tube part 18 whose length in the axial direction is long, and a short tube part 20 whose length in the axial direction is short, are integrally connected. The resin molded article 10 has the branched portion 14 wherein the short tube part 20 is provided to branch substantially at a right angle from the medium portion of the long tube part 18 in the length direction. Also, the long tube part 18 has a substantially U shape as a whole and the center portion thereof in the length direction curves in a semicircular shape to provide the curved portion 16.

Additionally, the whole resin molded article 10 of this embodiment is formed of a composite wherein a reinforcing fiber constituted by a continuous fiber is arranged in a state of being buried in the resin material as described later. One embodiment of the method of manufacturing this resin molded article 10 according to the present invention is described in the following.

Figure 2:
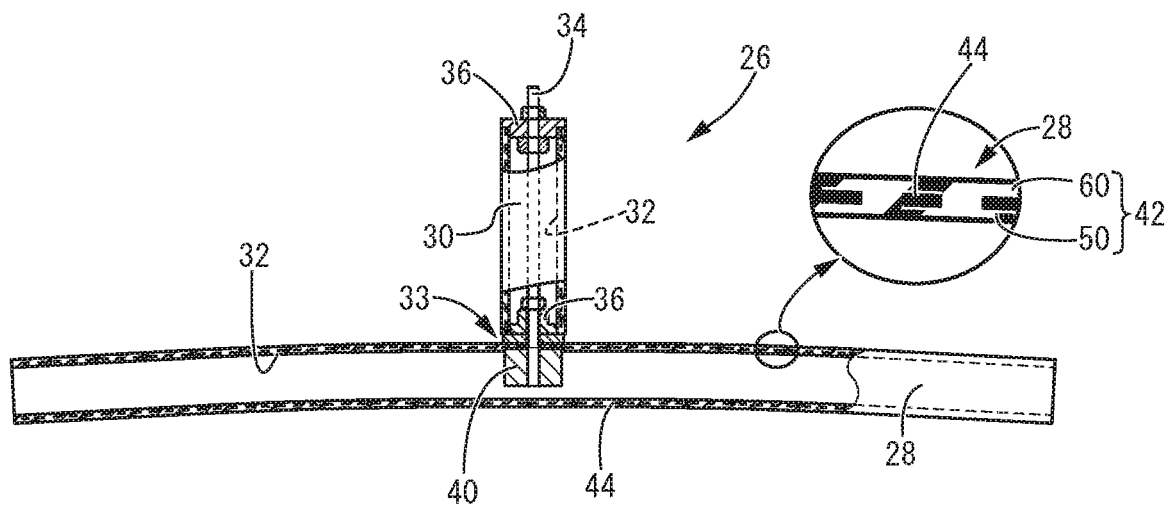
FIG. 2 is a front view showing an elastic core used in manufacturing the resin molded article shown in FIG. 1 being partially cut, as the first embodiment of the method of the present invention.

First, in order to provide the molding face for the inner periphery of the hollow hole 12 in the resin molded article 10, an elastic core 26 as shown in FIG. 2 is manufactured and prepared. This elastic core 26 includes a long axis part 28 corresponding to the long tube part 18 of the resin molded article 10 and a short axis part 30 corresponding the short tube part 20 of the resin molded article 10.

Both the long axis part 28 and the short axis part 30 are formed of an elastic material such as a rubber elastic body and elastomers to be elastically deformable. The long axis part 28 can be elastically deformed into a shape including a curved part corresponding to the curved portion 16 of the resin molded article 10. In addition, to the substantial center of the long axis part 28 in the length direction, one end of the short axis part 30 in the axial direction is connected and fixed.

Although the long axis part 28 and the short axis part 30 can be in solid forms, in the present embodiment, each of them is a pipe shape having a cross sectional shape of a hollow with a through hole 32 penetrating therethrough in the length direction. Specifically, in a case of the pipe shape compared to a case of a solid structure, elastic deformation in the direction of reducing the cross sectional area is efficiently caused to further facilitate mold removing from the resin molded article 10 described later.

In a connection part 33 of the short axis part 30 to the long axis part 28, corresponding to the branched portion 14 of the target resin molded article 10, the state of the long axis part 28 and the short axis part 30 as divided elastic cores can be changed between a separated state and a connected state as appropriate. Specifically, as shown in the drawing for example, a connecting bolt 34 inserted through the short axis part 30 is fastened to fixing lid bodies 36, 36 arranged on the both end openings of the short axis part 30, and additionally, one end of the connecting bolt 34 is connected to the long axis part 28 in a removable manner.

Specifically, the connecting bolt 34 protruding from one end of the short axis part 30 in the axial direction is inserted into the through hole 32 via a hole for connection formed on the peripheral wall of the long axis part 28, and screwed to a connecting block 40 arranged in the long axis part 28. By so doing, the peripheral wall of the long axis part 28 is clamped between the fixing lid body 36 of the short axis part 30 and the connecting block 40 so as to fasten the short axis part 30 to the long axis part 28. The connecting block 40 is positioned in the long axis part 28, and may be bonded thereto or alternatively may be removable from the long axis part 28. By manipulation via the outer end of the connecting bolt 34 protruding outside from the short axis part 30 to rotate the connecting bolt 34, the connecting bolt 34 is removed from the connecting block 40, allowing the short axis part 30 to separate from the long axis part 28 at the connection part 33.

The connection structure in the connection part 33 between the short axis part 30 and the long axis part 28, which constitutes the branched part in the elastic core 26, is not limited to the screw structure shown as an example. Alternatively, it is possible to use as appropriate a separable connection structure including a locking structure by a snap mechanism etc. like a grommet, an attraction structure by magnetic force, and a hook and loop fastener, for example. In these various connection structures as well, the connection to the long axis part 28 at one end of the short axis part 30 can be released as appropriate by manipulation of pulling the short axis part 30 from the other end or the like. The connection structure between the short axis part 30 and the long axis part 28 will do as long as the parts can be kept in contact in resin molding described later. Therefore, it is possible to adopt a structure wherein the parts can be kept in contact by pressing one of the parts against the other forcibly with outer force.

In a connection structure which does not require the connecting bolt 34 penetrating through the short axis part 30, it is possible to allow the short axis part 30 to be subject to curving deformation. Even if the connecting bolt 34 is used, the curving deformation of the short axis part 30 may be also allowed by using a deformable material at least for the medium portion of the connecting bolt 34 in the length direction.

Moreover, in the long axis part 28 and the short axis part 30 each having an elongated shape which constitute the elastic core 26, at least the long axis part 28 whose length is large includes a composite of an elastic body and continuous yarns. In the present embodiment, the short axis part 30 also includes the same composite as the long axis part 28. Specifically, in the long axis part 28 and the short axis part 30, a plurality of continuous yarns 44 extending in the length direction are arranged at and fixed to an elastic body 42 constituting the axis parts.

These continuous yarns 44 exert tensile force in the length direction of the elastic body 42. A material with a greater tensile rigidity than at least the elastic body 42 is used for them such that the tensile force exerted from one end in the length direction can be efficiently exerted substantially to the entire in the length direction. For example, resin fiber such as polyamide, polyester or the like is preferably adopted, though, it is possible to use aramid fiber etc. with a greater tensile strength or a greater rigidity.

In addition, it is desirable to arrange the continuous yarns 44 in a slanted way relative to the length direction, or in a prescribed braided structure so that, when the tensile force is exerted, the force of deformation and displacement in the direction of making the diameter smaller can be efficiently transmitted and exerted in the length direction of the elastic body 42. Specifically, it is preferable to use a braid wherein the plurality of continuous yarns 44 are mutually braided in the lengthwise direction in a prescribed braid structure, for example. Alternatively, it is preferable to adopt a spiral structure wherein the continuous yarns 44 are arranged in a spiral form at a prescribed lead angle relative to the lengthwise direction, or wherein the plurality of continuous yarns 44 extending in a spiral form tilting in the mutually different directions are arranged to be overlapped. If the braid structure or the spiral structure is used, it is also preferable to set the tilting angle of the continuous yarns 44 in relation to the axial direction of the elastic body 42 to be an angle close to an angle of repose or greater therethan only by the given amount so that the efficiency of action and transmission of the force in the direction of reduction in the cross section of the elastic body 42, accompanying the action of the tensile force, is improved.

Figure 3:
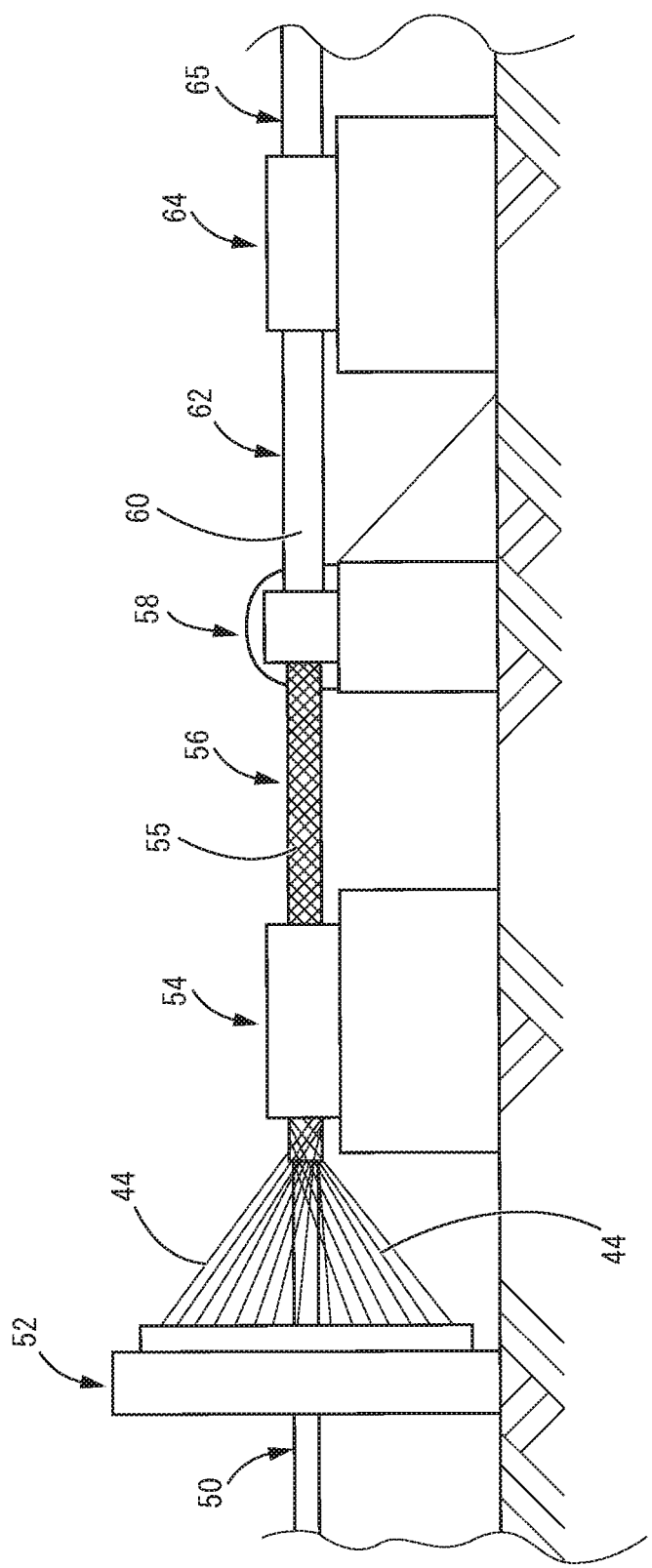
FIG. 3 is a view suitable for explaining one manufacturing process of the elastic core shown in FIG. 2.

The long axis part 28 and the short axis part 30 formed of the composite like this, can indeed be molded using a mold, by filling elastic material in a molding cavity with the continuous yarns 44 arranged. However, it is possible to manufacture them more efficiently using the molding device as shown in FIG. 3, for example.

Specifically, an inner layer elastic material 50 in a hollow or solid form (a hollow form in the present embodiment) is continuously provided for a braider 52 to be provided with the plurality of continuous yarns 44 on the surface of the inner layer elastic material 50 from the braider 52 to be taken off by a take-off machine 54. As a result, a medium material 56 having a braid 55 wherein the plurality of continuous yarns 44 are braided in a braid structure such that they cover the surface of the inner layer elastic material 50, is continuously obtained. For this braider 52, it is possible to use a braider known well as a device to braid something around a mandrel in a braid form, for example. Generally, the braider has a structure wherein continuous yarns given from each of a plurality of bobbins provided in bobbin carriers are supplied to the point of forming a braid via a guide ring so as to interlace and turn around a core like the mandrel etc., thereby braiding a braid in a braid form.

The medium material 56, which is continuously drawn out from the take-off machine 54 as the continuous yarns 44 are braided on the surface of the inner layer elastic material 50 by the braider 52, is supplied to a pushing molding machine 58 for the elastic body. In the pushing molding machine 58, using elastic materials provided from outside, an outer layer elastic material 60 is molded to cover the outer peripheral face of the medium material 56. By so doing, a complex 62 in a continuous tube shape wherein the plurality of continuous yarns 44 continuously extending in the length direction in a braid structure are arranged and fixed in a buried state between the inner layer elastic material 50 and the outer layer elastic material 60 overlapped integrally, is manufactured.

This complex 62 is continuously taken off by a take-off machine 64 from the pushing molding machine 58 to be subject to immobilization treatment such as polymerization process or vulcanization process on the inner and outer layer elastic materials 50, 60 depending on the necessity. Consequently, a continuous tube-shaped molded article 65 constituted by a composite of the elastic body 42 and the continuous yarns 44 in a braid structure, is obtained. After that, this tube-shaped molded article 65 is cut in an appropriate length to be the long axis part 28 or the short axis part 30 described above.

Next, using the elastic core 26 as shown in FIG. 2 which is formed by combining the long axis part 28 and the short axis part 30 obtained in this way, the fiber-reinforced resin molded article 10 illustrated in FIG. 1 is manufactured. The reinforcing fiber is arranged on the outer peripheral surface of the elastic core 26 before resin molding on the outer peripheral surface of the elastic core 26, thereby obtaining the resin molded article 10 made of the fiber-reinforced resin in a composite structure of the reinforcing fiber and the resin material.

Figure 4:
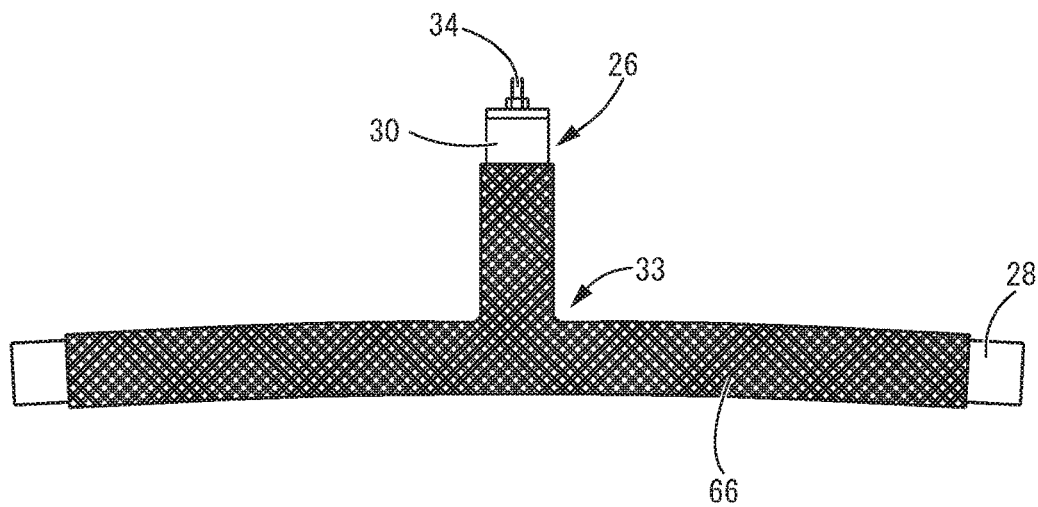
FIG. 4 is a view showing a state of the elastic core with a reinforcing fiber arranged on its surface, obtained in a process for manufacturing the resin molded article shown in FIG. 1 using the elastic core shown in FIG. 2.

Specifically, as shown in FIG. 4, the reinforcing fiber is arranged in an appropriate braided structure so as to cover the whole outer peripheral surface of the long axis part 28 and the short axis part 30 which constitute the elastic core 26, so that a reinforcing fiber layer 66 is formed. For this reinforcing fiber layer 66, the material, the form of fiber, the braided structure are selected as appropriate depending on the required characteristics for the resin molded article 10 and not especially limited. However, the reinforcing fiber layer 66 wherein the reinforcing fiber, which is a continuous fiber such as carbon fiber, glass fiber, or polymer fiber, is braided in a braid structure is preferably used for example.

With respect to the reinforcing fiber layer 66 in a braid structure, using the braider as shown in FIG. 3 for example, the elastic core 26 is positioned on the center for forming the braid to which the plurality of reinforcing fibers are supplied, and as it is moved in the length direction, the braid is formed on the outer peripheral surface of the elastic core 26, so that the reinforcing fiber layer 66 in a braid form can be formed. The reinforcing fiber layer 66 can be a braid structure of single layer, though it is possible to move the elastic core 26 back and forth in the length direction of the long axis part 28 or the short axis part 30 thereof in order to obtain a braid structure of multilayer.

In the elastic core 26, the long axis part 28, which is a longer one, can be subject to elastic deformation. Therefore, even if the elastic core 26 includes a branch structure, a part which becomes an obstacle in braiding using the braider in relation to the supply line of the reinforcing fiber etc. can be curved or bended so as to be moved out of the way. Especially in the present invention, it is also possible to make not only the long axis part 28 but also the short axis part 30 elastically deformable. Accordingly, the branch structure or the entire shape of the elastic core 26 can be avoided from being a major hindrance in formation of the reinforcing fiber layer 66. Moreover, even after the long axis part 28 or the short axis part 30 is subject to curving deformation, it can return to the original shape promptly based on its elasticity, without being an impediment to resin molding etc. performed later. Furthermore, the reinforcing fiber layer 66 formed on the outer peripheral surfaces of the long axis part 28 and the short axis part 30 is also in a deformable fiber-braid structure with a small diameter. Accordingly, the reinforcing fiber layer 66 can deform and go back to the original shape, following the long axis part 28 or the short axis part 30.

Figure 5:
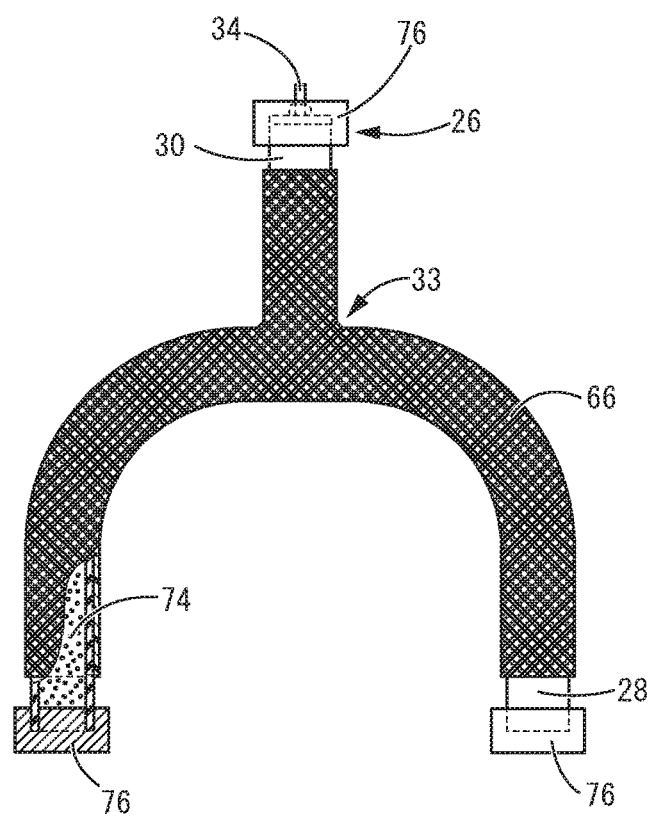
FIG. 5 is a view showing a deformation state of the elastic core shown in FIG. 4 being partially cut.

Therefore, the elastic core 26 with the reinforcing fiber layer 66 formed on its outer peripheral surface is subject to elastic deformation in the lengthwise direction of the long axis part 28, thereby enabling to make the outer peripheral surface which is the resin molding face as well as the reinforcing fiber layer 66 have a shape corresponding to the target resin molded article 10 (see FIG. 1) as shown in FIG. 5.

Figure 6:
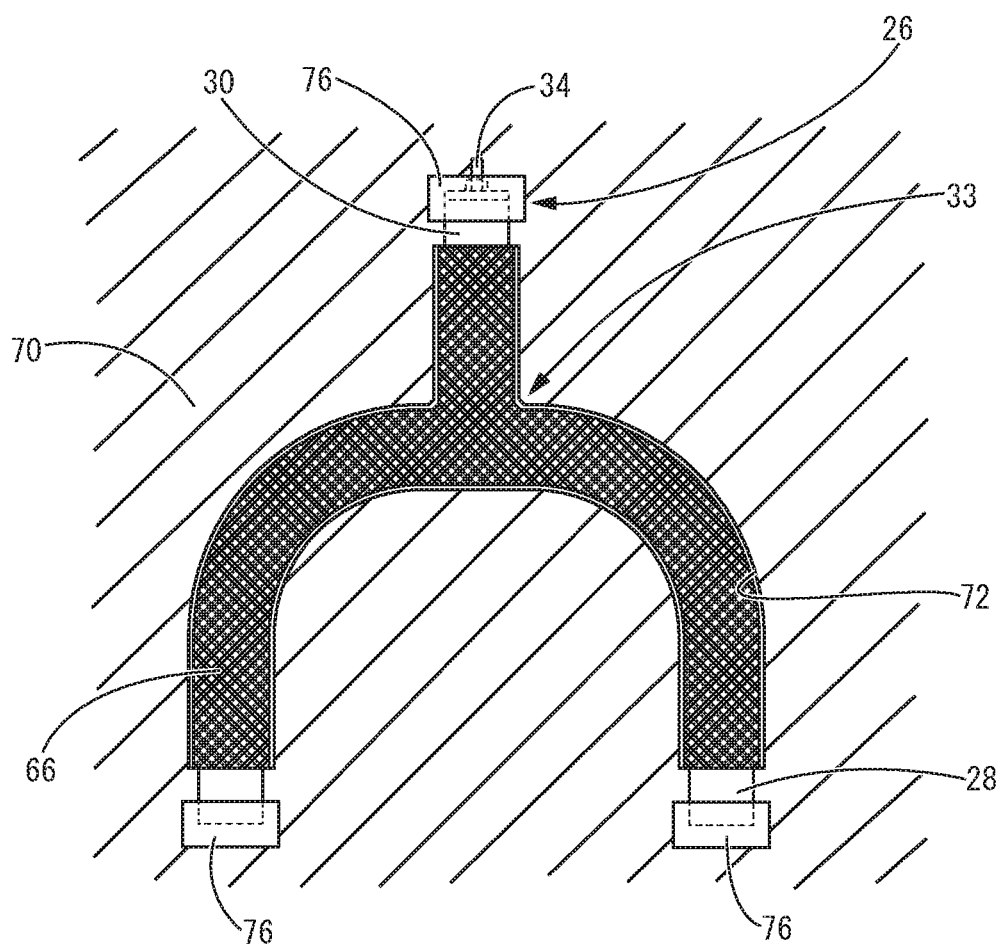
FIG. 6 is a view showing a state of the elastic core shown in FIG. 4 being set in a mold for the resin molded article in FIG. 1.

Then, as shown in FIG. 6, the elastic core 26 is arranged in the molding cavity of a mold 70 for the resin material so that the elastic core 26 is set by being positioned and kept in a state subject to elastic deformation into a shape corresponding to the target resin molded article 10 (see FIG. 1). After that, the mold is closed and the resin material is filled by injection or the like on the reinforcing fiber layer 66 on the outer peripheral surface of the elastic core 26. After cooling, the mold is opened and removed from the article. Consequently, it is possible to mold the resin molded article 10 fiber-reinforced by incorporating the reinforcing fiber layer 66 into the resin material with the reinforcing fiber layer 66 buried in the resin material.

Here, in the present invention, a hollow structure with the through hole 32 is used for the elastic core 26. Therefore, it is desirable to fill the inside of the through hole 32 with a non-compressible and amorphous filler material 74 in advance (see FIG. 5). It is preferable that this filler material 74 is a liquid or a grain-shaped solid of several millimeters or smaller to facilitate the works of filling it in the through hole 32 and removing it therefrom while allowing the deformation of the long axis part 28 in a state of the filler material 74 being filled. For example, it is possible to use water, grains of sand, or the like. Filling the filler material 74 in the hollow of the elastic core 26 leads to advantages that buckling deformation can be avoided during curving deformation to stabilize the shape of the curving deformation and that deformation due to the pressure of resin filled in a molding cavity 72 can be avoided. Meanwhile, enhancing the filling pressure of the filler material like a liquid in filling the filler material in the hollow of the elastic core 26 such that the elastic core 26 is expanded for example, can further facilitate mold removing by releasing the filling pressure and returning the elastic core 26 to its original dimension when mold-removing the elastic core 26.

Each of the openings of the long axis part 28 and the short axis part 30 of the elastic core 26 is sealed with an end cap 76 or the like which can be opened and closed such that it is possible to supply the filler material 74 into the hollow of the elastic core 26 and discharge it therefrom as appropriate and to retain the filled and sealed state.

Figure 7:
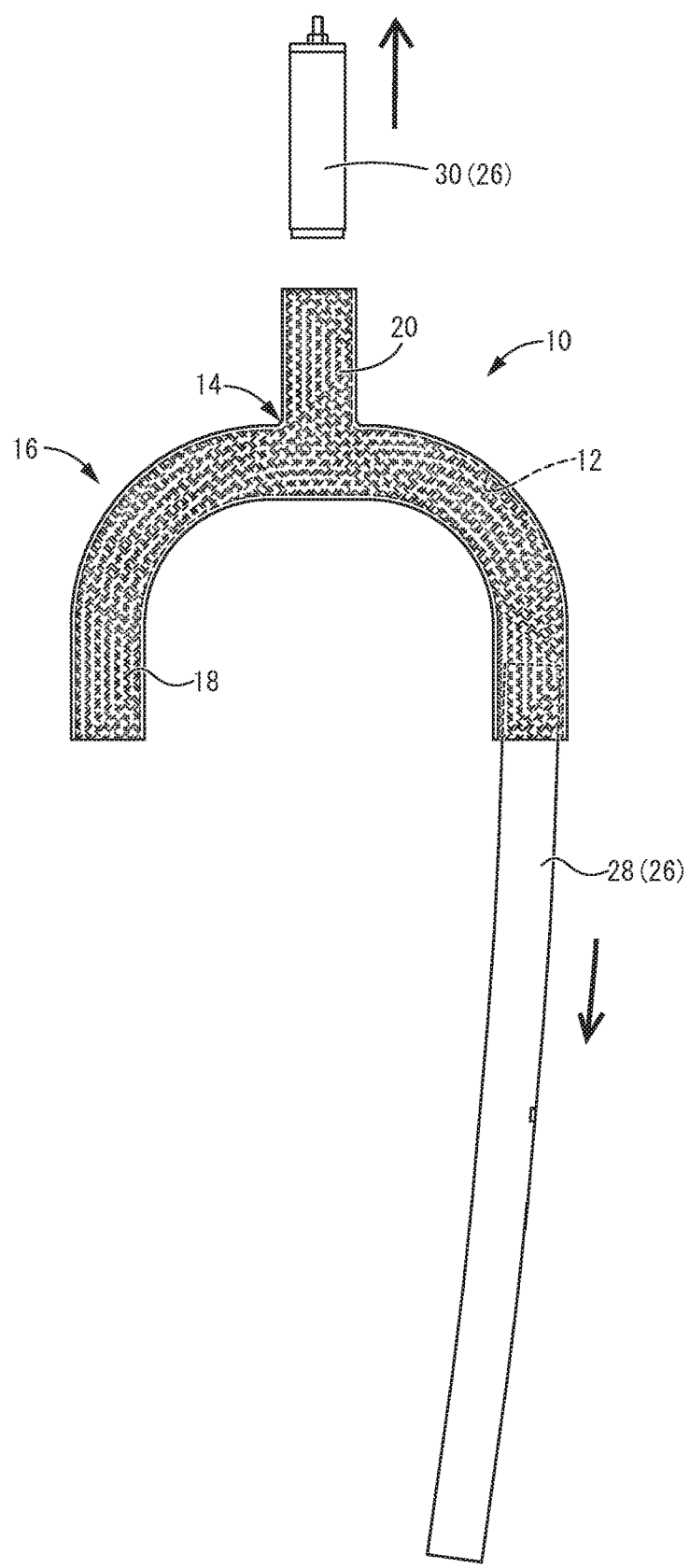
FIG. 7 is a view showing a process of extracting the elastic core from the resin molded article which is removed from the mold after resin molding in the mold shown in FIG. 6.

Then, the elastic core 26 is removed from the resin molded article 10 taken out of the mold 70 as shown in FIG. 6, thereby obtaining the resin molded article 10 as the target. When removing this elastic core 26, at least one end cap 76 is opened to extract the filler material 74 from the inside of the hollow while releasing the connection by the connecting bolt 34 to separate the long axis part 28 and the short axis part 30. Subsequently, as shown in FIG. 7, the long axis part 28 and the short axis part 30 are extracted from the resin molded article 10 by exerting the tensile force from one end of each of them in the length direction, in order to remove the elastic core 26.

Here, the long axis part 28 and the short axis part 30 are in a composite structure of the elastic body 42 and the continuous yarns 44. Accordingly, the tensile force exerted on one end in the length direction is efficiently exerted via the continuous yarns 44 arranged continuously in the length direction up to an area long enough toward the other end in the length direction. The long axis part 28 and the short axis part 30 on which the tensile force is exerted in the length direction are subject to not only stretching deformation in the length direction but also diameter-reduction deformation wherein the cross sectional area is reduced in an area long enough. Especially in the present embodiment, the long axis part 28 and the short axis part 30 each has a hollow cross sectional shape, thereby causing deformation of decreasing the cross section more efficiently.

In this way, in the long axis part 28 and the short axis part 30, the tensile force exerted from one end in the length direction is efficiently transmitted across an area long enough being accompanied by the stretching deformation in the length direction as well as the deformation of reducing the cross sectional area. As a result, although the long tube part 18 and the short tube part 20 of the resin molded article 10 have enough length and they are curved or deformed in the radial direction, it is possible to forcibly separate the outer peripheral surfaces of the long axis part 28 and the short axis part 30 as the elastic core 26 from the inner peripheral surface thereof. Therefore, by pulling the long axis part 28 and the short axis part 30 of the elastic core 26 from one end in the length direction for each of them after molding the resin molded article 10, it is possible to extract the elastic core 26 easily and rapidly from the long tube part 18 and the short tube part 20 of the resin molded article 10, allowing the resin molded article 10 to be removed from the mold.

Before or after being removed from the elastic core 26, the resin molded article 10 undergoes the posterior process such as an edge treatment for its end, as appropriate depending on the need, so as to be a product.

Additionally, the long axis part 28 and the short axis part 30 extracted from the resin molded article 10 can return to the original shapes promptly based on their own elasticity. Accordingly, after going through checking treatments like washing, inspection, or the like depending on the necessity, the axis parts can be used for a manufacturing process of resin molded articles repeatedly as the elastic core 26.

Therefore, according to the above-mentioned manufacturing method, by using the elongated elastic core 26 comprising the composite of the elastic body 42 and the continuous yarns 44 to mold the resin on the outer peripheral surface thereof, it becomes easy to remove the elastic core 26 after resin molding, thereby enabling to manufacture the resin molded article 10 in a hollow structure with excellent mass-productivity.

Illustrated as an example in the above-described embodiment is the case of manufacturing the resin molded article 10 formed of a fiber-reinforced resin by filling melted resin material in a state where the reinforcing fiber layer 66 made from the continuous fiber is braided in advance on the outer peripheral surface of the elastic core 26 set in the molding cavity 72. However, the reinforcing fiber layer 66 is not indispensable in the present invention and it is possible to manufacture a resin molded article which is not fiber-reinforced. In addition, by filling a resin material mixed with discontinuous reinforcing fiber formed of short fiber or long fiber in the molding cavity 72, it is possible to manufacture a resin molded article formed of the fiber-reinforced resin using the discontinuous fiber. As this discontinuous reinforcing fiber, any of glass fiber, aramid fiber, high-density polyethylene fiber, carbon fiber and the like can be adopted for example.

Also, in the above-mentioned embodiment, the resin material is injected in the molding cavity on the outer peripheral surface of the elastic core 26 which is covered with the reinforcing fiber layer 66 to mold the product made of the fiber-reinforced resin. In so doing, to obtain the composite structure of the reinforcing fiber layer 66 and the resin material in a stable manner, one requirement is fluidity of the resin material injected into the molding cavity. In light of this, it is possible to fill a resin material which has a great fluidity before polymerization in the molding cavity by injection in an unpolymerized state so as to make polymerization process such as heating in the molding cavity later for resin molding.

Alternatively, thermoplastic resin molded in a form of continuous fiber in advance can be arranged to cover the outer peripheral surface of the elastic core 26 in a braid or the like, together with the reinforcing fiber (reinforcing fiber layer) 66. In this way, the resin material, which is made in a form of continuous fiber, is arranged on the outer peripheral surface of the elastic core 26 in a tangled state with the reinforcing fiber 66 to be melted by applying heat later, efficiently impregnating the reinforcing fiber 66 with the resin material, which allows stable molding of the fiber-reinforced resin in a composite structure.

Furthermore, thermoplastic resin can be in powder form to be attached to the continuous fiber. The continuous fiber is arranged as the reinforcing fiber 66 on the surface of the elastic core 26 in a braided state etc. so that this resin material is melted by heating later, to efficiently have the reinforcing fiber 66 impregnated with the resin material to mold the fiber-reinforced resin in a composite structure.

In this way of making thermoplastic resin in a form of continuous fiber or powder to be attached to the surface of the reinforcing fiber 66 in a fitting manner as mixed with the reinforcing fiber 66 or to be mixed with the reinforcing fiber 66 alternatively before molding by melting treatment with heat, it is possible to stably obtain the resin molded article in the composite structure integrally formed with the reinforcing fiber, even in the case of a resin material which is difficult to secure enough fluidity.

Also, if thermoplastic resin is used as the resin material for the resin molded article 10, the fiber-reinforced resin molded article 10 can be molded using a prepreg formed of a sheet of fiber-reinforced resin molded in advance in a form of a sheet or a tape. The prepreg is made to cover the entire surface of the elastic core 26 to undergo a heat melting treatment later to be incorporated, by means of braiding this prepreg on the outer peripheral surface of the elastic core 26, by means of arranging it overlapped with the surface as sticking thereto, or by means of arranging it as wound around the elastic core 26.

Meanwhile, if thermosetting resin is used as the resin material for the resin molded article 10, since good fluidity is easily obtained in the resin material before hardening process, a prior treatment of mixing the resin material with the reinforcing fiber, a high filling pressure relative to the molding cavity or the like in the case of thermoplastic resin can be dispensable. Specifically, it is possible to arrange the continuous fiber impregnated with thermosetting resin material in advance on the outer peripheral surface of the elastic core 26 in a braid or the like to make hardening process on it later to obtain a thermosetting resin molded article which is fiber-reinforced, for example. Alternatively, it is possible to braid the continuous fiber on the outer peripheral surface of the elastic core 26 to impregnate it with the thermosetting resin material after that for performing hardening process thereon, thereby getting a thermosetting resin molded article which is fiber-reinforced. For a more specific example, on the outer peripheral surface of the elastic core 26 as an initial shape which is not a target curved shape for the molded article, the continuous fiber which is impregnated with the resin material in advance is braided. Then, this elastic core 26 undergoes curving deformation into a target shape to be kept in the state. Under the state, the resin is subject to hardening process and the elastic core 26 is extracted from the resin molded article i.e. the mold is removed after that, thereby obtaining the target resin molded article. It is possible to braid the continuous fiber impregnated with the resin material around the outer peripheral surface of the elastic core so as to overlap a resin sheet such as a sheeting tape etc. therewith depending on the necessity such that it coils around the elastic core later, to curve the elastic core into a target shape before performing hardening process. By overlapping the resin sheet with the braid layer of the continuous fiber on the outer peripheral side or on the inner peripheral side like this, it is possible to improve the degree of freedom in adjustment of the thickness of the resin layer or the like.

Figure 8:
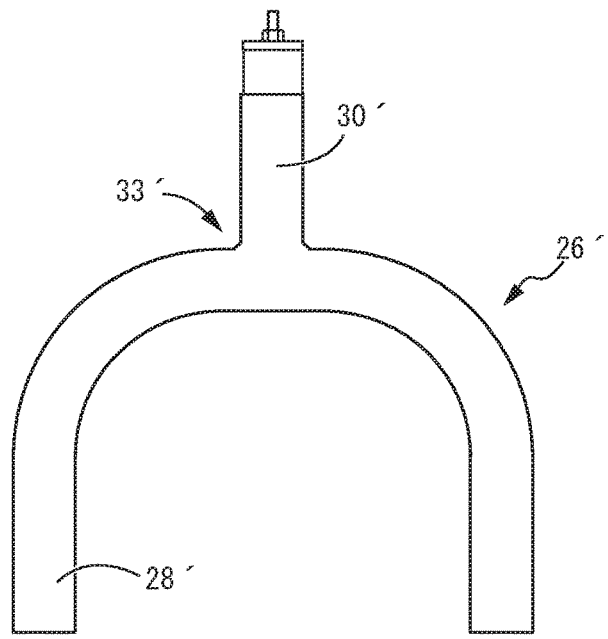
FIG. 8 is a front view showing another example of the elastic core used in manufacturing the resin molded article as another embodiment of the present invention.

In addition, for the aforementioned embodiment, on the elastic core 26 in an initial shape shown in FIG. 2 which is not under any outer force, an outer force is exerted as shown in FIGS. 5 and 6 to have it curved and perform resin molding on the outer peripheral surface while keeping the curved state, thereby forming the resin molded article 10. Alternatively, an elastic core 26' can be formed in a target shape having a curved portion in advance, as shown in FIG. 8 for example.

If the elastic core 26' having the curved portion or a connection part 33' is adopted like this, it is not necessary to deform it into the target shape and keep the shape in resin molding, thereby attaining easier resin molding work and a more stable shape. Also, even in the case of the elastic core 26' provided with the curved portion in the initial shape, it can be subject to elastic deformation and the deformation of reducing the cross sectional area in the action of the tensile force can be efficiently exerted in the length direction thereof. Consequently, as well as the above-mentioned embodiment, the tensile force is exerted to make it possible to extract each the long axis part 28' and the short axis part 30' from the resin molded article 10 after molding the resin molded article 10 on the outer peripheral surface.

Figure 9:
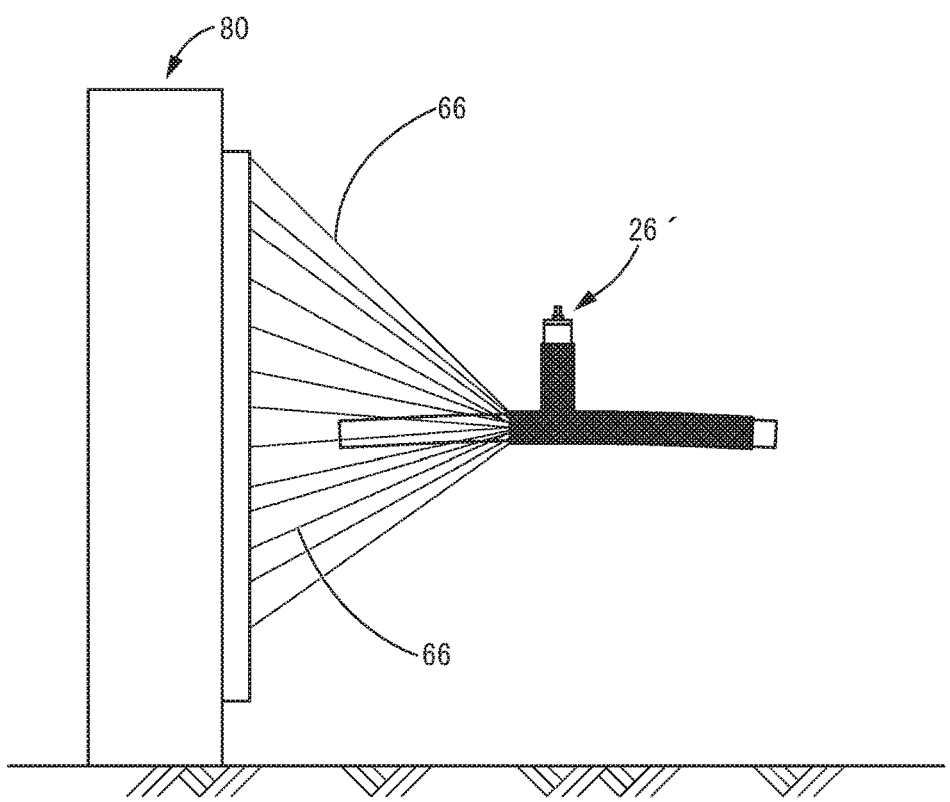
FIG. 9 is a view suitable for explaining a process of arranging a reinforcing fiber on the surface of the elastic core shown in FIG. 8 with a braider.

Additionally, since the elastic core 26' with the curved portion can also be subject to elastic deformation, even in braiding the reinforcing fiber on the outer peripheral surface of the elastic core 26' using a braider 80 or the like as shown in FIG. 9 for example, it is possible to apply elastic deformation by the means of stretching each part of the elastic core 26' as appropriate or the like, while avoiding an interference with the plurality of reinforcing fibers supplied to the point of braid forming. This can facilitate braiding operation of the reinforcing fiber on the surface of the elastic core 26'.

Since, in the elastic core 26 in the aforementioned embodiment, the long axis part 28 and the short axis part 30 are formed of the elastic material, it is possible to provide the curved portion 16 for the resin molded article 10 by curving them in the length direction when resin molding as well as change the setting of the cross sectional shape of the resin molded article 10 by elastically deforming the cross sectional shape. Specifically, pressing force is exerted in the axis-perpendicular direction on the short axis part 30 with a circular outer peripheral surface and the resultant oval shape of the outer peripheral surface is retained while the resin molded article 10 is molded, thereby enabling to obtain the resin molded article 10 with the cross sectional shape of the short tube part 20 being an oval tube.

In this way with the present invention, by using the elastic core 26 which can undergo elastic deformation, it is possible to mold a resin molded article in a different shape with the shape of the curved portion or the cross sectional shape different, without changing the elastic core 26 or the like.

Described in the above-described embodiment is the case where the resin molded article 10 including the branched portion 14 and the curved portion 16 in combination is manufactured using the branched elastic core 26 having the connection part 33 of the long axis part 28 and the short axis part 30. However, the method of this application can also be applied to the case of manufacturing a resin molded article in a hollow structure without a branched portion, using an elastic core including substantially only the long axis part. In addition, even in the case where a resin molded article provided with two or more branched portions or a plurality of curved portions is manufactured, the method of this invention can be applied thereto, by forming the elastic core with the corresponding branch structure.

Furthermore, with respect to the elastic core with at least one connection part 33 in a structure including the plurality of elongated parts like the long axis part 28 and the short axis part 30, even if each of the elongated parts has a hollow cross sectional shape, it is not necessary that the inside portions of the hollows are mutually connected. Each the axis parts can have a separate hollow cross sectional shape. Moreover, the cross sectional shape of the elastic core 26 is not limited to a solid circle and a hollow circle like examples. It is possible to use various cross sectional shapes including an oval and a polygon, whether solid or hollow, depending on the required resin molded article.

Also, in the case where the short axis part 30 is short enough relative to the long axis part 28 formed of the composite of the elastic body 42 and the continuous yarns 44 described above, or in the case one side in the axial direction is tapered for extraction, this short axis part 30 can be formed of an elastic core including only the single elastic body like a rubber etc. Furthermore, if a curved part is not set in the short axis part 30, the short axis part 30 can be formed of a rigid core like a metal etc.

The resin molded article 10 in a structure according to this invention is intended as an elongated resin molded article in a hollow structure as shown in the aforesaid embodiment, also in a structure including the curved portion 16 and the branched portion 14 in combination and in a composite structure wherein the resin material is reinforced with the reinforcing fiber 66 formed of the braided continuous fiber across the entire length including the curved portion 16 and the branched portion 14.

The resin molded article 10 like this, with a complex shape including the curved portion 16 and the branched portion 14, could not be formed in the past with a composite structure having the reinforcing fiber formed of the braided continuous fiber. Providing the aforementioned elastically deformable elastic core 26 and curving the parts as appropriate to make them out of the way of the braided fiber when braiding on the outer peripheral surface, makes it realizable. Therefore, the resin molded article 10 in an intricate and irregular shape in a structure according to this invention is an example of products which are made realizable only after providing the method of this invention.

Additionally, in manufacturing the resin molded article accordingly to the present invention, it is possible to integrally provide it with the separately manufactured other members and parts on resin molding, by means of burying, adhering, fixing as casting or the like. Then, it is possible to facilitate handlings like positioning in relation to those other members and parts, by fixing them to the elastic core or overlapping them with it. In the case, after resin molding, the elastic core is separated from the other members and parts, or the mold is extracted, to obtain the resin molded article integrally provided with the other members or parts.

Then, where it is made as the fiber-reinforced resin product reinforced with the continuous fiber as the resin molded article 10 in the above-referenced embodiment, the continuous fiber to be arranged to cover the outer peripheral surface of the elastic core is arranged to cover up to the outer peripheral surfaces of the above-mentioned other members and parts, enabling to obtain the resin molded article which is integrally fiber-reinforced up to around the other members and parts in question.

Figure 10:
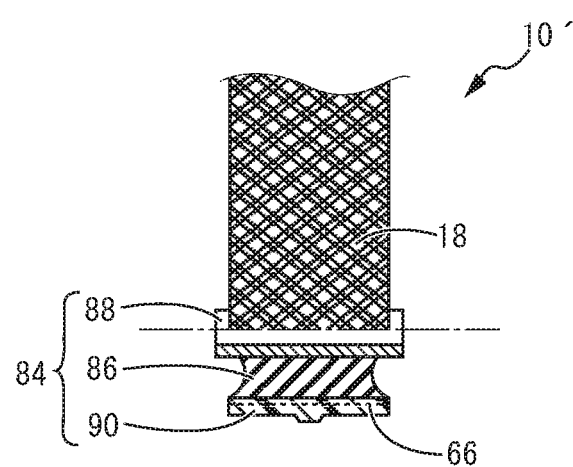
FIG. 10 is a cross sectional view showing a principal part of the resin molded article as yet another embodiment of this invention which is partially cut, taken along line 10-10 of FIG. 11.

For example as shown in FIG. 10, it is possible to obtain a resin molded article 10' in a structure where a rubber bushing 84, which is a mounting part made from the other member, is integrally provided for an end of the resin molded article 10 of the aforementioned embodiment (one end of the long tube part 18 in the length direction in the shown embodiment in the drawing).

Figure 11:
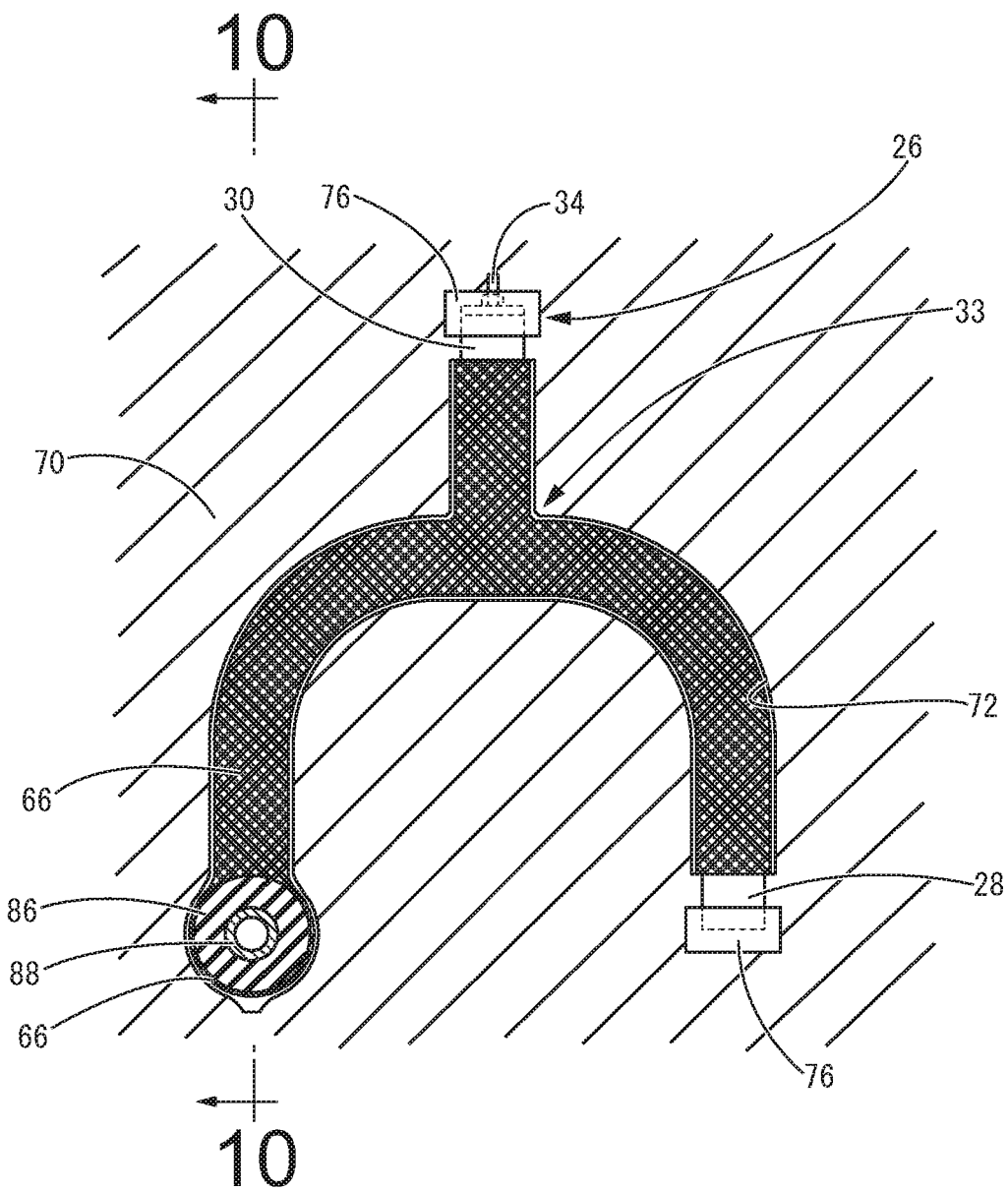
FIG. 11 is a view showing a manufacturing process of the resin molded article shown in FIG. 10 as an example.

In manufacturing this resin molded article 10', for example as shown in FIG. 11, the rubber bushing 84 which is separately formed is arranged in an overlapped way with one end face of the long axis part 28 of the elastic core 26 obtained according to the aforesaid embodiment. The structure of the rubber bushing 84 is not limited in any way. For example, it is possible to adopt a vibration damping rubber 86 in a thick circular tubular shape with the inner peripheral surface bonded by vulcanization to an inner fitting 88 in a circular tubular shape known well as a suspension bush etc.

As described in the above-described embodiment, the reinforcing fiber 66 is provided for the elastic core 26 so as to cover the outer peripheral surface thereof as braided or the like. Then, in relation to the rubber bushing 84 arranged on an end of the elastic core 26 as well, the reinforcing fiber 66 is braided or the like as covering the outer peripheral surface of the vibration damping rubber 86 so that the reinforcing fiber 66 is arranged to cover the both outer peripheral surfaces of the elastic core 26 and the vibration damping rubber 86 continuously. After that, in performing resin molding and molding the resin material in a composite structure wherein the reinforcing fiber 66 is integrally provided in a buried state, the resin is molded so as to cover the whole from the outer peripheral surface of the elastic core 26 to the outer peripheral surface of the vibration damping rubber 86. Consequently, as shown in FIG. 10, it is possible to form an outer tube-shaped part 90 covering the outer peripheral surface of the vibration damping rubber 86 of the rubber bushing 84 integrally with the long tube part 18 and the short tube part 20 each in a hollow structure. After resin molding, the mold is removed by extracting the long axis part 28 and the short axis part 30 of the elastic core 26 in the same way as the above-referenced embodiment, thereby obtaining the target fiber-reinforced resin molded article 10' which is integrally formed and in a hollow structure.

Therefore, the resin molded article 10' obtained like this has the given hollow shape including the branched portion 14 and the curved portion 16 while being in a structure wherein the rubber bushing 84 is integrally assembled on the molding. Especially in the present mode, the resin has a structure wherein the peripheral wall of the long tube part 18 and the outer tube-shaped part 90 of the rubber bushing 84 are integrally formed being reinforced by the continuous reinforcing fiber. This reduces the processes of assembly of the rubber bushing 84 to facilitate the manufacture, while enabling to advantageously secure the strength of the assembly part of the rubber bushing 84.

In relation to resin molding on the outer peripheral surfaces of the elastic core 26 and the rubber bushing 84, as shown in FIG. 11 for example, it is possible to use the same mold as the aforementioned embodiment and set the continuous reinforcing fiber braided as if it covers the outer peripheral surfaces of the elastic core 26 and the rubber bushing 84 in the molding cavity to provide the resin material in this molding cavity for molding later.

Also, if epoxy resin or the like is adopted as described above, it is possible to use a prepreg in a shape of a resin sheet made of prepolymer integrally formed with the continuous reinforcing fiber. In the case, the outer peripheral surfaces of the elastic core 26 and the rubber bushing 84 can be covered with this prepreg, and then performing hardening process using heat etc. can make it in a crosslinking network state with epoxy group for molding. In the case of using the molding method with a prepreg, it is also possible to cover the entire periphery of the rubber bushing 84 with the prepreg and, further over them, arrange other prepreg to cover both outer peripheral surfaces of the elastic core 26 and the rubber bushing 84 continuously, thereby forming the outer tube-shaped part 90 in a shape of a tube for covering the entire periphery of the rubber bushing 84.

The present invention can be performed in other modes changed, amended, modified or the like in various ways, not cited one by one, based on the knowledge of the skilled person. Needless to say, any such embodiments are included in the range of the present invention provided that they do not depart from the purport of this invention.

What is claimed is:

1. A method of manufacturing an elongated resin molded article having a hollow structure, the method comprising:
   molding a resin material on an outer peripheral surface of an elongated elastic core, the elastic core comprising a composite of an elastic body and a continuous yarn, and the continuous yarn being braided on the elastic body so that a tilting angle of the continuous yarn in relation to an axial direction of the elastic body is set to be an angle of repose or greater than the angle of repose and so that the tilting angle of the continuous yarn is offset from an axis of a lengthwise direction of the elastic body;
   exerting tensile force on the elastic core in the lengthwise direction of the elastic core, whereby the braided continuous yarn transmits the tensile force in the lengthwise direction of the elastic core and results in a cross sectional area and diameter of the elastic core being reduced so as to facilitate extraction of the elastic core from the molded resin material; and
   extracting the elastic core having the reduced cross sectional area and reduced diameter from the molded resin material in a lengthwise direction of the molded resin material so as to obtain the elongated resin molded article having the hollow structure.

2. The method of manufacturing the resin molded article according to claim 1, wherein the elastic core has a cross sectional shape of a hollow.

3. The method of manufacturing the resin molded article according to claim 2, further comprising filling the hollow with a non-compressible, amorphous filler material during the molding of the resin material on the outer peripheral surface of the elastic core.

4. The method of manufacturing the resin molded article according to claim 1, wherein the resin molded article is formed of a fiber-reinforced resin in which the resin material is fiber-reinforced.

5. The method of manufacturing the resin molded article according to claim 4, wherein a reinforcing fiber comprising at least one continuous fiber and forming the fiber reinforcement of the fiber-reinforced resin is arranged on the outer peripheral surface of the elastic core, and the resin molded article comprising the fiber-reinforced resin which is reinforced with the reinforcing fiber is obtained by the molding of the resin material.

6. The method of manufacturing the resin molded article according to claim 5, wherein the at least one continuous fiber comprises a plurality of continuous fibers, and the continuous fibers are arranged so as to cover the outer peripheral surface of the elastic core in a braided form while the elastic core is subjected to curving deformation.

7. The method of manufacturing the resin molded article according to claim 5, wherein the resin material comprises thermosetting resin, and the resin molded article comprising the fiber-reinforced resin is obtained by arranging the at least one continuous fiber impregnated with the thermosetting resin so as to cover the outer peripheral surface of the elastic core and then performing a hardening process on the thermosetting resin.

8. The method of manufacturing the resin molded article according to claim 5, wherein the resin material comprises thermosetting resin, and the resin molded article comprising the fiber-reinforced resin is obtained by arranging the at least one continuous fiber so as to cover the outer peripheral surface of the elastic core and then, during said molding of the thermosetting resin, impregnating the at least one continuous fiber with the thermosetting resin and performing a hardening process thereon.

9. The method of manufacturing the resin molded article according to claim 5, wherein the resin material comprises thermoplastic resin, and the resin molded article comprising the fiber-reinforced resin is obtained by arranging the thermoplastic resin while in fiber form together with the at least one continuous fiber so as to cover the outer peripheral surface of the elastic core and then performing a melt molding process on the thermoplastic resin.

10. The method of manufacturing the resin molded article according to claim 5, wherein the resin material comprises thermoplastic resin, and the resin molded article comprising the fiber-reinforced resin is obtained by adhering the thermoplastic resin while in powder form to the at least one continuous fiber, arranging the at least one continuous fiber comprising the adhered resin so as to cover the outer peripheral surface of the elastic core, and then performing a melt molding process on the thermoplastic resin.

11. The method of manufacturing the resin molded article according to claim 5, wherein the resin material comprises thermoplastic resin, and the resin molded article comprising the fiber-reinforced resin is obtained by arranging the at least one continuous fiber so as to cover the outer peripheral surface of the elastic core while providing an unpolymerized material of the thermoplastic resin on the outer peripheral surface of the elastic core and impregnating the unpolymerized material into the at least one continuous fiber, and then performing a polymerization molding process on the unpolymerized material.

12. The method of manufacturing the resin molded article according to claim 4, wherein the resin material is fiber-reinforced by being mixed with a discontinuous reinforcing fiber.

13. The method of manufacturing the resin molded article according to claim 1, wherein the molding takes place with the elastic core being subjected to elastic deformation into a target shape corresponding for the resin molded article.

14. The method of manufacturing the resin molded article according to claim 13, wherein the deformation of the elastic core is such that a cross sectional shape of at least a part of the elastic core in the lengthwise direction thereof is changed.

15. The method of manufacturing the resin molded article according to claim 1, wherein:
the elastic core includes a branched part;
the elastic core comprises a plurality of elongated divided elastic cores separably connected to each other at the branched part; and
during the extracting, the divided elastic cores are separated and extracted in respective lengthwise directions thereof after the molding of the resin molded article.

16. The method of manufacturing the resin molded article according to claim 1, wherein:
the resin molded article is integrally provided with a tube part and a mounting part, the mounting part being made from an other member and provided for an end of the tube part;
the resin molded article is formed of a fiber-reinforced resin in which the resin material is fiber-reinforced; and
a reinforcing fiber comprising at least one continuous fiber is arranged to cover both the outer peripheral surface of the elastic core and an outer peripheral surface of the mounting part continuously, and the resin molded article comprising the fiber-reinforced resin which is reinforced with the reinforcing fiber is obtained by molding the resin material, while a peripheral wall of the tube part and an outer peripheral wall of the mounting part are integrally formed by being reinforced by the continuous reinforcing fiber.

17. The method of manufacturing the resin molded article according to claim 1, wherein the method further comprises, prior to the molding, shaping the elastic core from an original shape to a target shape for the resin molded article by elastic deformation of the elastic core, and wherein the molding molds the resin material on the outer peripheral surface of the shaped elastic core having the target shape.

* * * * *